United States Patent
Yang et al.

(10) Patent No.: US 8,149,374 B2
(45) Date of Patent: Apr. 3, 2012

(54) CHOLESTERIC LIQUID CRYSTAL DISPLAY DEVICES WITH ACTUATING THIN-FILM DRIVING ELEMENTS

(75) Inventors: Jen-Chieh Yang, Changhua County (TW); Yuan-Chang Liao, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 355 days.

(21) Appl. No.: 12/468,001

(22) Filed: May 18, 2009

(65) Prior Publication Data
US 2010/0134706 A1 Jun. 3, 2010

(30) Foreign Application Priority Data
Dec. 1, 2008 (TW) .............................. 97146580 A

(51) Int. Cl.
*G02F 1/1335* (2006.01)
*C09K 19/02* (2006.01)

(52) U.S. Cl. ......................... 349/169; 349/12; 349/115

(58) Field of Classification Search .................. 349/115, 349/168, 169, 175, 176, 185
See application file for complete search history.

(56) References Cited

U.S. PATENT DOCUMENTS

| | | | |
|---|---|---|---|
| 4,472,026 A | 9/1984 | Boyd et al. | |
| 6,753,933 B2 | 6/2004 | Cirkel et al. | |
| 2003/0043317 A1 | 3/2003 | Cirkel et al. | |
| 2003/0071958 A1 | 4/2003 | Wu et al. | |
| 2004/0196230 A1 | 10/2004 | Nose et al. | |
| 2006/0182898 A1* | 8/2006 | Ben-Shalom et al. | 428/1.3 |
| 2009/0167967 A1* | 7/2009 | Hirakata et al. | 349/12 |
| 2011/0234623 A1* | 9/2011 | Ure | 345/592 |

FOREIGN PATENT DOCUMENTS
JP 2002006280 A * 1/2002

* cited by examiner

*Primary Examiner* — Michelle R Connelly Cushwa

(57) ABSTRACT

Cholesteric liquid crystal display (Ch-LCD) devices with actuating thin-film driving elements are presented. The Ch-LCD device includes a first substrate and an opposing second substrate. An actuating thin-film structure is disposed on the first substrate. A cholesteric liquid crystal layer is filled between the first substrate and the second substrate. A common electrode is disposed on the second substrate. In operation, the actuating thin-film structure is deformed to drive phase transition of the cholesteric liquid crystal layer.

37 Claims, 3 Drawing Sheets

US 8,149,374 B2

CHOLESTERIC LIQUID CRYSTAL DISPLAY DEVICES WITH ACTUATING THIN-FILM DRIVING ELEMENTS

CROSS REFERENCE TO RELATED APPLICATIONS

This application is based upon and claims the benefit of priority from a prior Taiwanese Patent Application No. 097146580, filed on Dec. 1, 2008, the entire contents of which are incorporated herein by reference.

BACKGROUND OF THE INVENTION

1. Field of the Invention

The invention relates to liquid crystal display (LCD) devices, and in particular to cholesteric liquid crystal display (Ch-LCD) devices integrated with actuating devices.

2. Description of the Related Art

Liquid crystal display (LCD) devices have many advantages such as a smaller size, lighter weight and lower power consumption, and are applicable in a variety of electronic and communication devices including notebook computers, personal digital assistants (PDA), mobile phones and the like due to its lighter weight, thinner profile, and portability.

Conventional reflective memorable color liquid crystal display devices are widely applicable in electronic books, electronic papers, and the likes. After a conventional cholesteric liquid crystal display (Ch-LCD) is driven, arrangement of the cholesteric liquid crystal molecules cannot return to their initial arrangements, resulting in high reflection losses at bright state. Moreover, when display image of the Ch-LCD device is renewed, the cholesteric liquid crystal molecules have to be switched to a hemeotropic state, also referred as "H" state, the driving voltage of which exceeding about 50 volts.

The driving techniques of the conventional Ch-LCD device is achieved by voltage driving, i.e., change waveform and time frame of the driving signal to drive phase transition of the cholesteric liquid crystal. Voltage driving methods, however, cannot make the cholesteric liquid crystal molecules return to the original planar state (i.e., bright state), resulting in high reflection losses at bright state. The following description introduces several driving techniques for Ch-LCD devices.

U.S. Pat. No. 4,472,026, the entirety of which is hereby incorporated by reference, discloses a Ch-LCD device using thermal driving method to drive phase transition of the cholesteric liquid crystal. FIG. 1 is a cross section schematically showing a conventional Ch-LCD device. Electric field is exerted on the cholesteric liquid crystal molecules to change from horizontal arrangement to vertical arrangement. The cholesteric liquid crystal molecules are heated to change from vertical arrangement to horizontal arrangement. Referring to FIG. 1, a Ch-LCD device 10 includes an upper substrate 11 and a lower substrate 16. Electrodes 17a and 17b are disposed on the lower substrate 11, and a common electrode 15 is disposed on the upper substrate 16. Alignment layers 12, 18a, and 18b are disposed on the lower substrate 11, and an alignment 14 is disposed on the common electrode 15. A cholesteric liquid crystal layer 13 is interposed between the upper substrate 16 and the lower substrate 11. Conventional driving method for the CH-LCE is achieved by heating. Passive matrix electrodes are biased passing current therethrough. The cholesteric liquid crystal is transformed from a dark-state arrangement to a bright-state arrangement due to electrode resistive heating. Therefore, it is prevented that the cholesteric liquid crystal is driven to the "H" state under a high voltage. High reflection losses, however, are still inevitable.

U.S. Pat. No. 6,753,933, the entirety of which is hereby incorporated by reference, discloses a pixel chamber structure in a Ch-LCD device. Arrangement of the cholesteric liquid crystal molecules can be changed by exerting pressure on the pixel chamber. FIG. 2 is a cross section schematically illustration another conventional Ch-LCD device. In FIG. 2, a Ch-LCD device 20 includes an upper substrate 21 and a lower substrate 22. Chambers 23 and 24 for liquid crystal flow are interposed between the upper substrate 21 and the lower substrate 22. A cholesteristic liquid crystal layer 26 is disposed in a display area. The gap of the cholesteristic liquid crystal layer 26 is supported by spacers 27. On operation, arrangement of the cholesteristic liquid crystal is changed by exerting a pressure P at the chamber 23. Therefore, it is prevented that the cholesteric liquid crystal is driven to the "H" state under a high voltage. Exerting pressure is not efficient enough to change the entire display frame. Furthermore, it is also impossible to transform the cholesteristic liquid crystal in each pixel area. High reflection losses are still inevitable.

U.S. Pub. No. 2003/0071958, the entirety of which is hereby incorporated by reference, discloses a method for inputting image in a Ch-LCD device using a stylus pressure. FIG. 3 is a cross section schematically showing another conventional Ch-LCD device. A Ch-LCD device 30 includes an upper substrate 37 and a lower substrate 39. Electrodes 38 and 36 are respectively disposed on the upper substrate 37 and the lower substrate 39. An absorption layer 32 is disposed underlying the lower substrate 39. A liquid crystal layer 35 is sandwiched between the upper substrate 37 and the lower substrate 39. The gap of the liquid crystal layer 35 is maintained by spacers 31. Arrangement of the liquid crystal molecules is changed by exerting pressure on the display device using a stylus input device 33. The stylus input cannot efficiently control display gray-scales and switches of display information.

Furthermore, U.S. Pub. No. 2004/0196230, the entirety of which is hereby incorporated by reference, discloses a Ch-LCD system. High voltage is generated by a piezoelectric material under pressure to provided voltage for transforming cholesteric liquid crystal. FIG. 4 is a schematic diagram illustrating a conventional piezoelectric controlled Ch-LCD system. Referring to FIG. 4, a Ch-LCD device 40 includes an upper substrate 44 and a lower substrate 41. Electrodes 45 and 42 are respectively disposed on the upper substrate 44 and the lower substrate 41. An absorption layer 43 is disposed underlying the lower substrate 41. A liquid crystal layer 46 is sandwiched between the upper substrate 44 and the lower substrate 41. The gap of the liquid crystal layer 46 is maintained by spacers 47. A driving device 50 is served to provide high voltage for phase transition of the cholesteric liquid crystal layer 46. The driving device 50 includes a voltage generating device 52 (e.g., a piezoelectric element), a step-down transformer 54, and a phase difference generating circuit 56. Conventional high voltage power is replaced by the piezoelectric element to reduce fabrication cost of the entire system. The reflection losses due to high voltage driving the cholesteric liquid crystal are still inevitable.

BRIEF SUMMARY OF THE INVENTION

Embodiments of the invention provide a cholesteric liquid crystal display (Ch-LCD) device, comprising: a first substrate and a second substrate opposing to each other; an actuating thin-film structure disposed on the first substrate; a cholesteric liquid crystal layer filled between the first substrate and the second substrate; and a common electrode disposed on the second substrate, wherein, in operation, the actuating thin-film structure is deformed to drive phase transition of the cholesteric liquid crystal layer.

Embodiments of the invention also provide a cholesteric liquid crystal display (Ch-LCD) device, comprising: a first substrate and a second substrate opposing to each other; an auxiliary structure disposed overlying the first substrate between which a cavity is formed creating a diaphragm region; an actuating thin-film structure disposed on the auxiliary structure; a cholesteric liquid crystal layer filled between the first substrate and the second substrate; and a common electrode disposed on the second substrate, wherein, in operation, the actuating thin-film structure is deformed to drive phase transition of the cholesteric liquid crystal layer, and wherein a deformation area of the actuating thin-film structure is corresponding to the diaphragm region.

Embodiments of the invention further provide a cholesteric liquid crystal display (Ch-LCD) device, comprising: a substrate and an actuating thin-film structure opposing to each other; a cholesteric liquid crystal layer filled between the first substrate and the actuating thin-film structure; and a common electrode disposed on the substrate, wherein, in operation, the actuating thin-film structure is deformed to drive phase transition of the cholesteric liquid crystal layer.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The features and aspects of the invention provide cholesteric liquid crystal display (Ch-LCD) devices integrated with actuating devices. The display driving mechanism of the Ch-LCD device includes pushing and pressing the cholesteric liquid crystal layer to transform the cholesteric liquid crystal. More specifically, a piezoelectric thin film or a static driven thin film is formed in display pixels of the Ch-LCD device. Bias is applied on the piezoelectric thin film to generate deformation. Different levels of deformation of the piezoelectric thin film can effectively achieve continuous gray-levels in bi-stable display performance.

Figure 1:
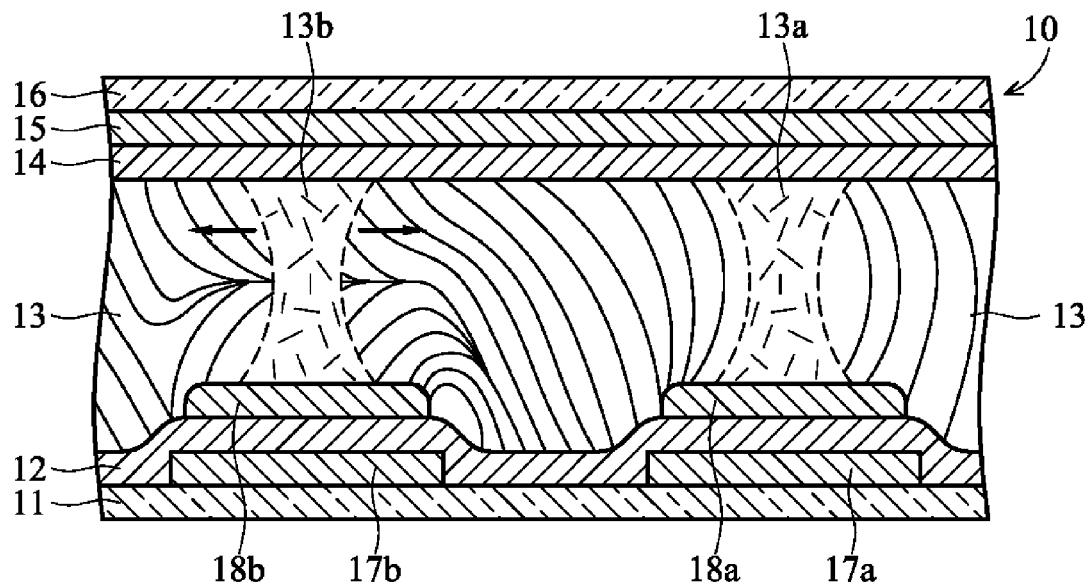
FIG. 1 is a cross section schematically showing a conventional Ch-LCD device.
Figure 2:
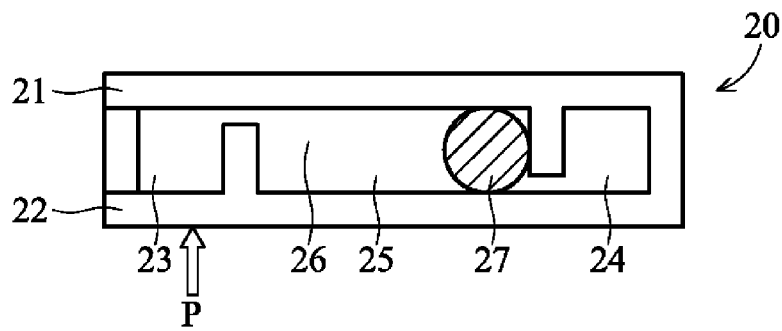
FIG. 2 is a cross section schematically illustration another conventional Ch-LCD device.
Figure 3:
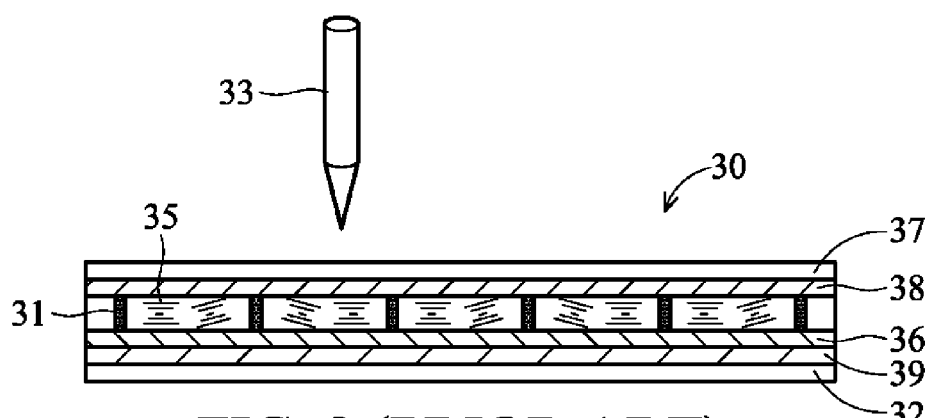
FIG. 3 is a cross section schematically showing another conventional Ch-LCD device.
Figure 4:
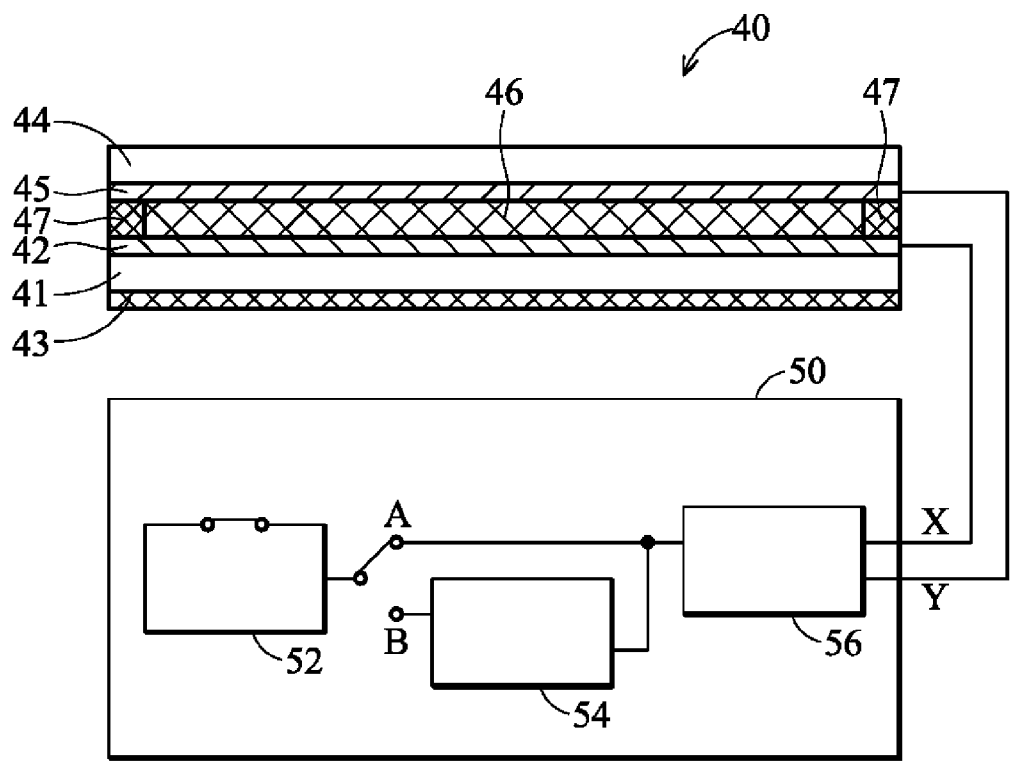
FIG. 4 is a schematic diagram illustrating a conventional piezoelectric controlled Ch-LCD system.
Figure 5:
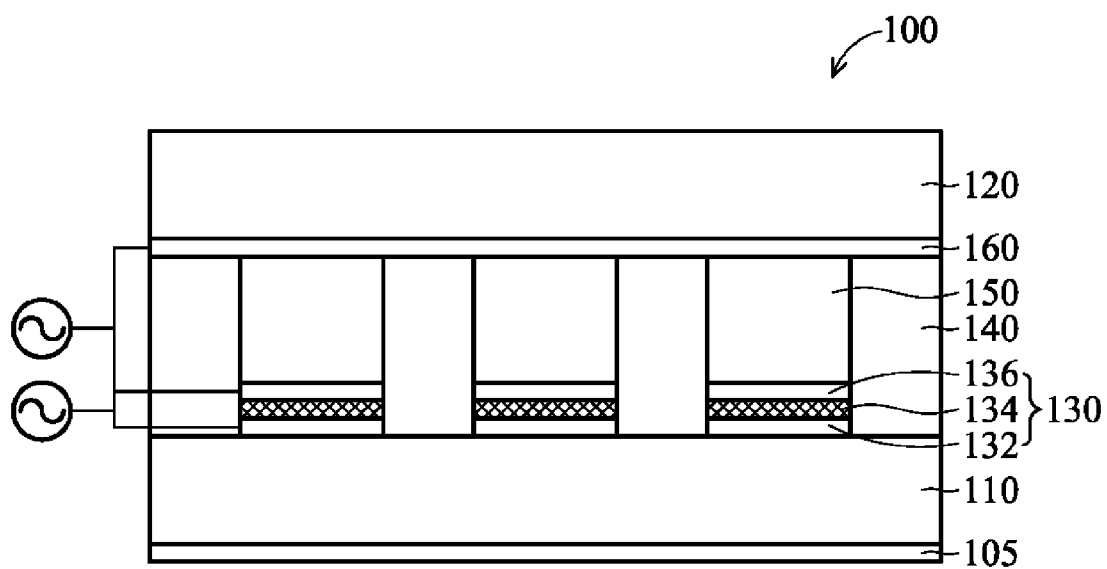
FIG. 5 is a cross section illustrating an embodiment of a Ch-LCD device of the invention.

FIG. 5 is a cross section illustrating an embodiment of a Ch-LCD device of the invention. Referring to FIG. 5, a Ch-LCD device 100 includes a first substrate 110 and a second substrate 120 opposing to each other. The first substrate 110 and the second substrate 120 can be made of a glass substrate or a flexible substrate. For example, the flexible substrate includes a polycarbonate (PC) substrate, a polyethersulfone (PES) substrate, a polyethylene terephthalate (PET) substrate, a polyimide (PI) substrate, a polyimide (PI) substrate, a polynitrobenzene (PNB) substrate, a polyetheretherketone (PEEK) substrate, a polyethylenenapthalate (PEN) substrate, a polyethyleneimine (PEI), and a poly(ADP-ribose) (PAR) substrate. An actuating thin-film structure 130 is disposed on the first substrate 110. The actuating thin-film structure 130 can be a stacked structure including a first electrode 132, a piezoelectric thin film 134, and a second electrode 136. The piezoelectric thin film includes zinc oxide (ZnO), aluminum nitride (AlN), barium titanate, lead titanate, or lead zirconate titanate (PZT). The first and second electrodes can be transparent electrodes, comprising indium tin oxide (ITO) or indium zinc oxide (IZO).

A cholesteric liquid crystal layer 150 is filled between the first substrate 110 and the second substrate 120. The cholesteric liquid crystal layer 150 comprises a micro-capsulated liquid crystal material or a polymer-stabilized liquid crystal material. A common electrode 160 is disposed on the second substrate 120. The common electrode 160 can be a transparent electrode, comprising indium tin oxide (ITO) or indium zinc oxide (IZO).

According to an embodiment of the invention, the Ch-LCD device 100 further includes a partition structure 140 interposed between the first substrate 110 and the second substrate 120, thereby defining a plurality of pixels or sub-pixel regions. In each sub-pixel region, the cholesteric liquid crystal layer has different color to compose a full-color cholesteric liquid crystal display device. The Ch-LCD device 100 can also further include a first alignment layer (not shown) disposed on the actuating thin-film structure, and a second alignment layer (not shown) disposed on the common electrode, wherein both the first and second alignment layers are contacted with the cholesteric liquid crystal layer, providing initial orientation for the cholesteric liquid crystal layer. Alternatively or optionally, an absorption layer 105 is disposed underlying the first substrate 110.

In operation, the actuating thin-film structure 130 is deformed to drive phase transition of the cholesteric liquid crystal layer 150. In one embodiment, the actuating thin-film structure comprises an electric field driven actuator, a static driven actuator, an electromagnetic driven actuator, or a thermal deformation driven actuator. Therefore, embodiments of the invention fabricate a piezoelectric thin film in a Ch-LCD device. The piezoelectric thin film is deformed and driven by electric field. Deformation of the piezoelectric thin film can push flowing of the cholesteric liquid crystal. Arrangements of the cholesteric liquid crystal molecules are changed as the liquid crystal flows. More specifically, the piezoelectric thin film is driven by electric field inducing phase transition of the cholesteric liquid crystal layer. Gray-level control can be achieved by controlling different deformation degrees of the piezoelectric thin film. The display frames can be erased or renewed by electrically driving the cholesteric liquid crystal to a focal conic state. On the other hand, the cholesteric liquid crystal can be driven to a planar state, rendering a gray-level or a bright state.

Figure 6:
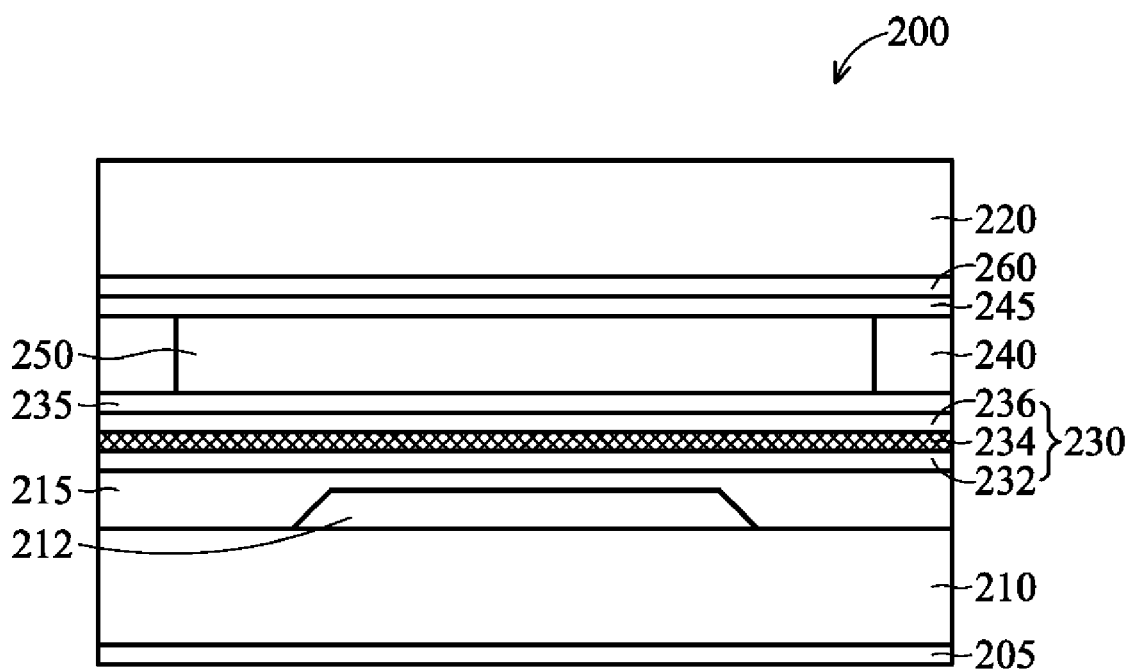
FIG. 6 is a cross section illustrating another embodiment of a Ch-LCD device of the invention.

FIG. 6 is a cross section illustrating another embodiment of a Ch-LCD device of the invention. Referring to FIG. 6, a Ch-LCD device 200 includes a first substrate 210 and a second substrate 220 opposing to each other. An auxiliary structure 215 is disposed overlying the first substrate 210 between which a cavity 212 is formed creating a diaphragm region. An actuating thin-film structure 230 is disposed on the auxiliary structure 215. The actuating thin-film structure 230 can be a stacked structure including a first electrode 232, a piezoelectric thin film 234, and a second electrode 236. A cholesteric liquid crystal layer 250 is filled between the first substrate 210 and the second substrate 220. A common electrode 260 is disposed on the second substrate 220.

According to another embodiment of the invention, the Ch-LCD device 200 further includes a partition structure 240 interposed between the first substrate 210 and the second substrate 220, thereby defining a plurality of pixels or sub-pixel regions. In each sub-pixel region, the cholesteric liquid crystal layer has different color to compose a full-color cholesteric liquid crystal display device. The Ch-LCD device 200 can also further include a first alignment layer 235 disposed on the actuating thin-film structure 230, and a second alignment layer 245 disposed on the common electrode 260, wherein both the first and second alignment layers 235 and 245 are contacted with the cholesteric liquid crystal layer, providing initial orientation for the cholesteric liquid crystal layer. Alternatively or optionally, an absorption layer 205 is disposed underlying the first substrate 210.

In operation, the actuating thin-film structure 230 is deformed to drive phase transition of the cholesteric liquid crystal layer 250. The deformation area of the actuating thin-film structure is corresponding to the diaphragm region. In one embodiment, the actuating thin-film structure comprises an electric field driven actuator, a static driven actuator, an electromagnetic driven actuator, or a thermal deformation driven actuator. Therefore, embodiments of the invention fabricate a piezoelectric thin film in a Ch-LCD device. The piezoelectric thin film is deformed and driven by electric field. Deformation of the piezoelectric thin film can push flowing of the cholesteric liquid crystal, resulting in rearrangement of the cholesteric liquid crystal molecules.

Figure 7:
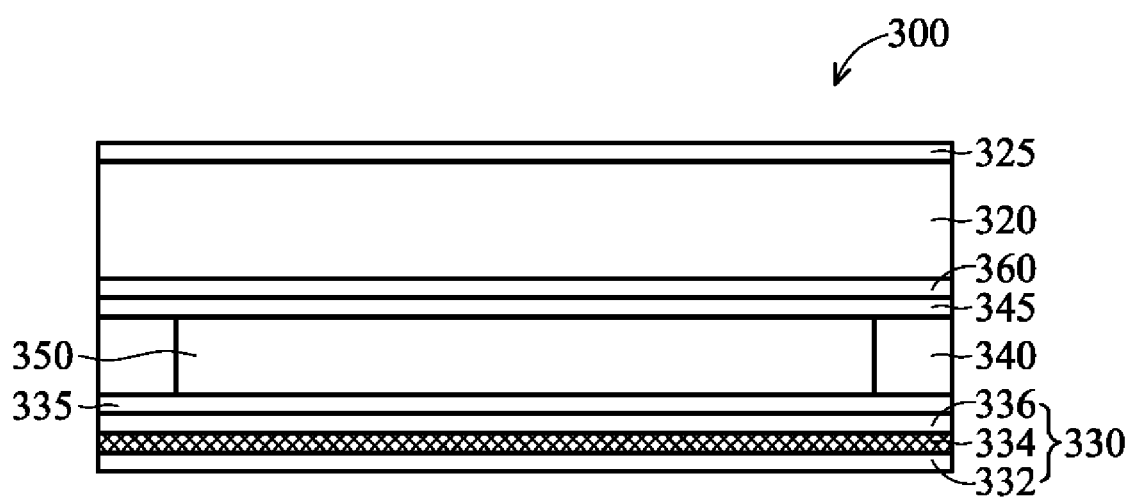
FIG. 7 is a cross section illustrating further another embodiment of a Ch-LCD device of the invention.

FIG. 7 is a cross section illustrating further another embodiment of a Ch-LCD device of the invention. Referring to FIG. 7, a Ch-LCD device 300 includes a substrate 320 and an actuating thin-film structure 330 opposing to each other. The actuating thin-film structure 330 can be a stacked structure including a first electrode 332, a piezoelectric thin film 334, and a second electrode 336. A cholesteric liquid crystal layer 350 is filled between the substrate 320 and the actuating thin-film structure 330. A common electrode 360 is disposed on the substrate 320.

According to another embodiment of the invention, the Ch-LCD device 300 further includes a partition structure 340 interposed between the substrate 320 and the actuating thin-film structure 330, thereby defining a plurality of pixels or sub-pixel regions. In each sub-pixel region, the cholesteric liquid crystal layer has different color to compose a full-color cholesteric liquid crystal display device. The Ch-LCD device 300 can also further include a first alignment layer 335 disposed on the actuating thin-film structure 330, and a second alignment layer 345 disposed on the common electrode 360, wherein both the first and second alignment layers 335 and 345 are contacted with the cholesteric liquid crystal layer, providing initial orientation for the cholesteric liquid crystal layer. Alternatively or optionally, an absorption layer 325 is disposed overlying the substrate 320.

In operation, the actuating thin-film structure is deformed to drive phase transition of the cholesteric liquid crystal layer. In one embodiment, the actuating thin-film structure comprises an electric field driven actuator, a static driven actuator, an electromagnetic driven actuator, or a thermal deformation driven actuator. Therefore, embodiments of the invention fabricate a piezoelectric thin film in a Ch-LCD device. The piezoelectric thin film is deformed and driven by electric field. Deformation of the piezoelectric thin film can push flowing of the cholesteric liquid crystal, resulting in rearrangement of the cholesteric liquid crystal molecules.

Some embodiments of the invention provide a reflection improvement structure in the Ch-LCD device. A piezoelectric thin film is integrated into pixel structure of the Ch-LCD device. The piezoelectric thin film is driven by electric field generating deformation to push flowing of the cholesteric liquid crystal. Rearrangements of the cholesteric liquid crystal molecules are occurred as the liquid crystal flows. Different levels of deformation of the piezoelectric thin film can effectively achieve continuous gray-levels in bi-stable display performance. High reflection losses due to high driving voltage can thus be prevented. The liquid crystal layer can be transformed to the hemeotropic state without using high voltage.

While the invention has been described by way of example and in terms of the several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cholesteric liquid crystal display (Ch-LCD) device, comprising:
    a first substrate and a second substrate opposing to each other;
    an actuating thin-film structure disposed on the first substrate;
    a cholesteric liquid crystal layer filled between the first substrate and the second substrate; and
    a common electrode disposed on the second substrate,
    wherein, in operation, the actuating thin-film structure is deformed to drive phase transition of the cholesteric liquid crystal layer.

2. The Ch-LCD device as claimed in claim 1, further comprising a partition structure interposed between the first substrate and the second substrate, thereby defining a plurality of pixels or sub-pixel regions.

3. The Ch-LCD device as claimed in claim 2, wherein, in each sub-pixel region, the cholesteric liquid crystal layer has different color to compose a full-color cholesteric liquid crystal display device.

4. The Ch-LCD device as claimed in claim 1, wherein the actuating thin-film structure comprises a first electrode, a piezoelectric thin film, and a second electrode.

5. The Ch-LCD device as claimed in claim 4, wherein the piezoelectric thin film comprises zinc oxide (ZnO), aluminum nitride (AlN), barium titanate, lead titanate, or lead zirconate titanate (PZT).

6. The Ch-LCD device as claimed in claim 1, wherein the first substrate and the second substrate are made of a glass substrate or a flexible substrate.

7. The Ch-LCD device as claimed in claim 6, wherein the flexible substrate comprises a polycarbonate (PC) substrate, a polyethersulfone (PES) substrate, a polyethylene terephthalate (PET) substrate, a polyimide (PI) substrate, a polyimide (PI) substrate, a polynitrobenzene (PNB) substrate, a polyetheretherketone (PEEK) substrate, a polyethylenenapthalate (PEN) substrate, a polyethyleneimine (PEI), or a poly(ADP-ribose) (PAR) substrate.

8. The Ch-LCD device as claimed in claim 1, wherein the common electrode is a transparent electrode, comprising indium tin oxide (ITO) or indium zinc oxide (IZO).

9. The Ch-LCD device as claimed in claim 1, further comprising a first alignment layer disposed on the actuating thin-film structure, and a second alignment layer disposed on the common electrode, wherein both the first and second alignment layers are contacted with the cholesteric liquid crystal layer, providing initial orientation for the cholesteric liquid crystal layer.

10. The Ch-LCD device as claimed in claim 1, wherein the cholesteric liquid crystal layer comprises a micro-capsulated liquid crystal material or a polymer-stabilized liquid crystal material.

11. The Ch-LCD device as claimed in claim 1, wherein the actuating thin-film structure comprises an electric field driven actuator, a static driven actuator, an electromagnetic driven actuator, or a thermal deformation driven actuator.

12. The Ch-LCD device as claimed in claim 1, further comprising an absorption layer disposed underlying the first substrate.

13. A cholesteric liquid crystal display (Ch-LCD) device, comprising:
    a first substrate and a second substrate opposing to each other;
    an auxiliary structure disposed overlying the first substrate between which a cavity is formed creating a diaphragm region;
    an actuating thin-film structure disposed on the auxiliary structure;
    a cholesteric liquid crystal layer filled between the first substrate and the second substrate; and
    a common electrode disposed on the second substrate,
    wherein, in operation, the actuating thin-film structure is deformed to drive phase transition of the cholesteric liquid crystal layer, and
    wherein a deformation area of the actuating thin-film structure is corresponding to the diaphragm region.

14. The Ch-LCD device as claimed in claim 13, further comprising a partition structure interposed between the first substrate and the second substrate, thereby defining a plurality of pixels or sub-pixel regions.

15. The Ch-LCD device as claimed in claim 14, wherein, in each sub-pixel region, the cholesteric liquid crystal layer has different color to compose a full-color cholesteric liquid crystal display device.

16. The Ch-LCD device as claimed in claim 13, wherein the auxiliary structure is made of a photoresist, a photo curing resin, or a thermal curing resin.

17. The Ch-LCD device as claimed in claim 13, wherein the actuating thin-film structure comprises a first electrode, a piezoelectric thin film, and a second electrode.

18. The Ch-LCD device as claimed in claim 17, wherein the piezoelectric thin film comprises zinc oxide (ZnO), aluminum nitride (AlN), barium titanate, lead titanate, or lead zirconate titanate (PZT).

19. The Ch-LCD device as claimed in claim 13, wherein the first substrate and the second substrate are made of a glass substrate or a flexible substrate.

20. The Ch-LCD device as claimed in claim 19, wherein the flexible substrate comprises a polycarbonate (PC) substrate, a polyethersulfone (PES) substrate, a polyethylene terephthalate (PET) substrate, a polyimide (PI) substrate, a polyimide (PI) substrate, a polynitrobenzene (PNB) substrate, a polyetheretherketone (PEEK) substrate, a polyethylenenapthalate (PEN) substrate, a polyethyleneimine (PEI), or a poly(ADP-ribose) (PAR) substrate.

21. The Ch-LCD device as claimed in claim 13, wherein the common electrode is a transparent electrode, comprising indium tin oxide (ITO) or indium zinc oxide (IZO).

22. The Ch-LCD device as claimed in claim 13, further comprising a first alignment layer disposed on the actuating thin-film structure, and a second alignment layer disposed on the common electrode, wherein both the first and second alignment layers are contacted with the cholesteric liquid crystal layer, providing initial orientation for the cholesteric liquid crystal layer.

23. The Ch-LCD device as claimed in claim 13, wherein the cholesteric liquid crystal layer comprises a micro-capsulated liquid crystal material or a polymer-stabilized liquid crystal material.

24. The Ch-LCD device as claimed in claim 13, wherein the actuating thin-film structure comprises an electric field driven actuator, a static driven actuator, an electromagnetic driven actuator, or a thermal deformation driven actuator.

25. The Ch-LCD device as claimed in claim 13, further comprising an absorption layer disposed underlying the first substrate.

26. A cholesteric liquid crystal display (Ch-LCD) device, comprising:
    a substrate and an actuating thin-film structure opposing to each other;
    a cholesteric liquid crystal layer filled between the substrate and the actuating thin-film structure; and
    a common electrode disposed on the substrate,
    wherein, in operation, the actuating thin-film structure is deformed to drive phase transition of the cholesteric liquid crystal layer.

27. The Ch-LCD device as claimed in claim 26, further comprising a partition structure interposed between the substrate and the actuating thin-film structure, thereby defining a plurality of pixels or sub-pixel regions.

28. The Ch-LCD device as claimed in claim 27, wherein, in each sub-pixel region, the cholesteric liquid crystal layer has different color to compose a full-color cholesteric liquid crystal display device.

29. The Ch-LCD device as claimed in claim 26, wherein the actuating thin-film structure comprises a first electrode, a piezoelectric thin film, and a second electrode.

30. The Ch-LCD device as claimed in claim 29, wherein the piezoelectric thin film comprises zinc oxide (ZnO), aluminum nitride (AlN), barium titanate, lead titanate, or lead zirconate titanate (PZT).

31. The Ch-LCD device as claimed in claim 26, wherein the substrate is made of a glass substrate or a flexible substrate.

32. The Ch-LCD device as claimed in claim 31, wherein the flexible substrate comprises a polycarbonate (PC) substrate, a polyethersulfone (PES) substrate, a polyethylene terephthalate (PET) substrate, a polyimide (PI) substrate, a polyimide (PI) substrate, a polynitrobenzene (PNB) substrate, a polyetheretherketone (PEEK) substrate, a polyethylenenapthalate (PEN) substrate, a polyethyleneimine (PEI), or a poly(ADP-ribose) (PAR) substrate.

33. The Ch-LCD device as claimed in claim 26, wherein the common electrode is a transparent electrode, comprising indium tin oxide (ITO) or indium zinc oxide (IZO).

34. The Ch-LCD device as claimed in claim 26, further comprising a first alignment layer disposed on the actuating thin-film structure, and a second alignment layer disposed on the common electrode, wherein both the first and second alignment layers are contacted with the cholesteric liquid crystal layer, providing initial orientation for the cholesteric liquid crystal layer.

35. The Ch-LCD device as claimed in claim 26, wherein the cholesteric liquid crystal layer comprises a micro-capsulated liquid crystal material or a polymer-stabilized liquid crystal material.

36. The Ch-LCD device as claimed in claim 26, wherein the actuating thin-film structure comprises an electric field driven actuator, a static driven actuator, an electromagnetic driven actuator, or a thermal deformation driven actuator.

37. The Ch-LCD device as claimed in claim 26, further comprising an absorption layer disposed overlying the substrate.

* * * * *